2,699,339

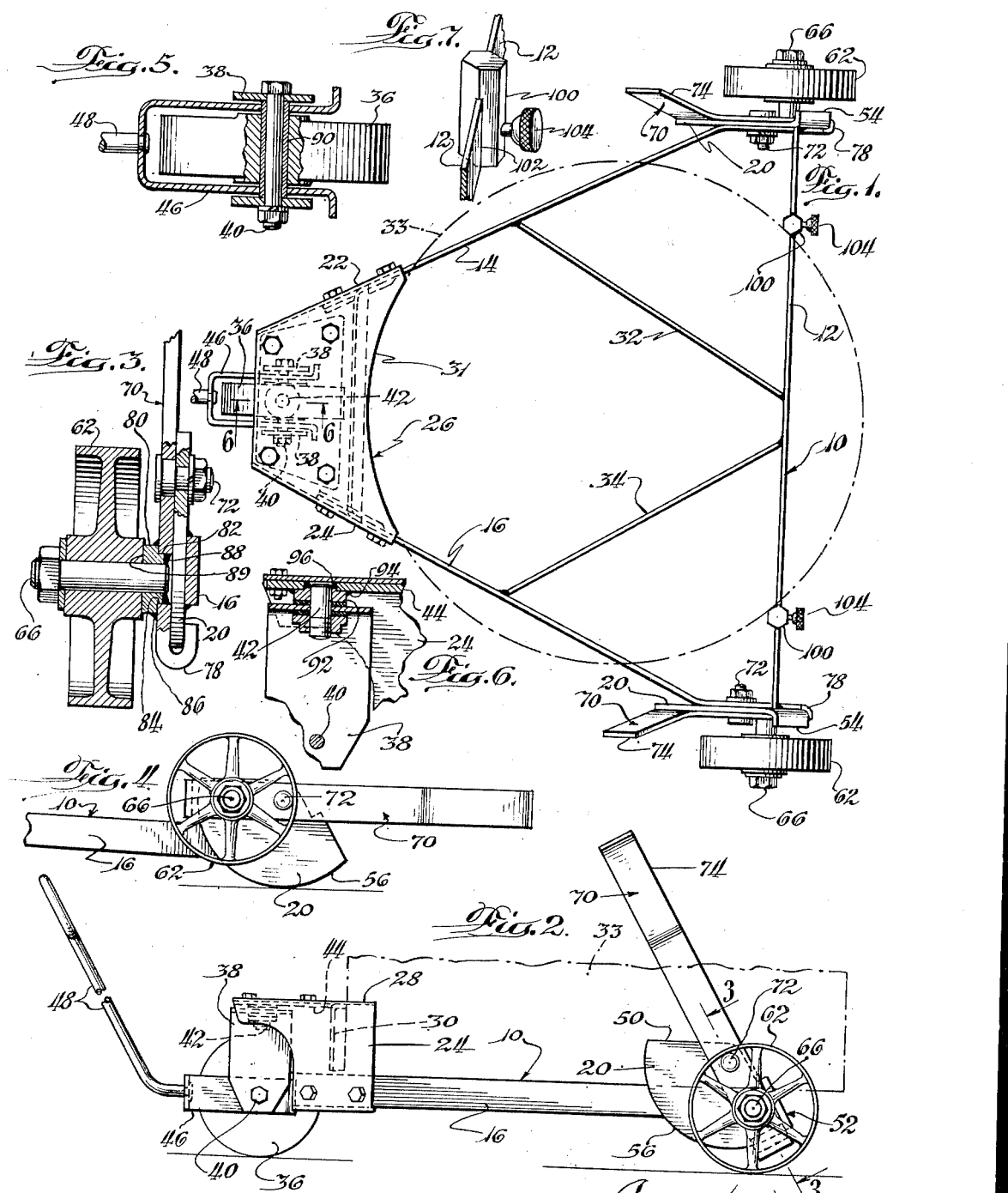

DOLLY WITH RETRACTIBLE WHEEL MOUNTING

Arthur R. Benstein, Des Plaines, Ill., assignor to Stewart-Warner Corporation, Chicago, Ill., a corporation of Virginia Application October 7, 1950, Serial No. 188,977

6 Claims. (Cl. 280—11)

This invention relates to a dolly for transporting a heavy lubricant drum or some other similar heavy object.

One of the objects of the invention is to provide a wheeled dolly which may be lowered onto skid means to be easily and safely loaded and unloaded, which will hold a drum securely while it is being transported, and which is particularly maneuverable.

A further object is to provide a dolly of the above type with an improved retractable wheel and skid support assembly of sturdy, economical construction which provides for effective lowering of the dolly to an extremely low position for safe, easy loading of heavy drums and the like.

Further objects and advantages of the invention will become apparent from the following description of an illustrative embodiment of the invention, taken in connection with the drawings, in which:

Fig. 1 is a top view of the illustrative embodiment of the dolly;

Fig. 2 is a side view of the embodiment;

Fig. 3 is a fragmentary sectional view illustrating a retractable wheel mounting, taken on the line 3—3 of Fig. 2;

Fig. 4 is a fragmentary side view showing one of the wheels in its retracted position;

Fig. 5 is a fragmentary top view partly in section of the front wheel assembly of the illustrative dolly;

Fig. 6 is a fragmentary sectional view taken on the line 6—6 of Fig. 1 illustrating the swivel mounting of the front wheel of the illustrative dolly; and Fig. 7 is a fragmentary perspective view illustrating a removable lug for retaining a drum on the dolly.

The illustrative embodiment of the dolly of this invention shown in Figs. 1 and 2 has a generally triangular load-carrying platform or frame 10 having three principal members including a rear bar 12 and two side bars 14 and 16.

The rear ends of the side bars 14 and 16 are welded or otherwise secured to a pair of plates or skids 20, and the ends of the rear bar 12 are also welded or otherwise secured to the skids adjacent the ends of the side bars.

The front ends of the side bars 14 and 16 are bolted or otherwise secured to opposite side walls 22 and 24 of a generally keystone shaped front wheel housing 26. As most clearly shown in Fig. 2, the side walls 22 and 24 of the wheel housing 26 are bent downwardly from a top plate 28 which is located at a level somewhat above the level of the frame bars 12, 14 and 16. The rigidity of the front wheel housing 26 is increased by providing a rear wall 30 which is welded or otherwise secured to the inner surfaces of the side walls and the top plate of the housing. The top plate 28 has an arcuate rear edge 31 for snugly engaging the cylindrical surface of a drum, shown in phantom at 33.

The strength and rigidity of the platform 10 are increased by two cross-bars 32 and 34 welded or otherwise secured between the side bars 14 and 16, respectively, and the rear bar 12.

The dolly has a front wheel 36 which is rotatably mounted on a fork or clevis 38 by means of an axle 40, as most clearly shown in Fig. 2. The clevis 38 is swiveled on a pivot 42 which is secured to a mounting plate 44. The mounting plate 44 is bolted or otherwise secured to the underside of the top plate 28. The details of the front wheel and clevis assembly and the pivot and mounting plate assembly are described below in connection with Figs. 5 and 6.

The axle 40 for the front wheel 36 also carries a yoke 46 to which the lower end of a handle or tongue 48 is secured.

The rear plates or skids 20 are in the form of circular sectors extending over somewhat more than 90°. One generally radial edge 50 of each of the skids is approximately horizontal and extends forwardly, and the other radial edge 52 extends backwardly and downwardly at an inclined angle. The inclined radial edges 52 are folded outwardly to form abutment means comprising stops 54 (Fig. 1). The circular periphery 56 of each of the skids 20 extends forwardly and downwardly below the frame bars 12, 14 and 16.

The dolly has a pair of rear wheels 62 rotatably mounted on axles or pivots 66 secured to mounting levers 70. The levers 70 are pivoted to the skids 20 by pivots 72 located at the centers of curvature of the circular peripheries 56 of the skids. The wheel axles 66 are secured to the levers 70 at points below the pivots 72. The levers have operating members comprising comparatively long upper arms or handles 74.

Further details of the assembly of the rear axles 66, the mounting levers 70 and the skids 20 will be described in connection with Fig. 3.

When the dolly is to be rolled about on a floor surface, the rear wheels 62 occupy the positions shown in Figs. 1 and 2. The axles 66 for the wheels are then positioned below and slightly behind the pivots 72 of the mounting levers 70. As shown in Fig. 2, the levers are displaced in a counterclockwise direction to positions somewhat inclined from the vertical. Consequently the weight of the dolly with its load tends to rotate the mounting levers counterclockwise (with reference to the position of the levers in Fig. 2). However, such counterclockwise rotation of the levers is arrested by engagement of the lower ends of the levers with the stops 54 on the skids 20.

As best shown in Fig. 3, the lower ends of the levers 70 are bent inwardly to form U-shaped brackets 78 embracing the circular peripheral edges 56 of the skids 20. These brackets 78 provide lateral support for the lower ends of the levers.

As best shown in Fig. 4, the rear wheels 62 may be retracted to an inoperative position in order to lower the skids 20 to the floor surface. The retraction is accomplished by rotating the upper arms or handles 74 of the levers 70 backwardly or clockwise approximately to horizontal positions. In these positions of the wheel mounting levers 70, the axles 66 for the rear wheels are positioned at approximately the same level as the pivots 72 of the levers and in front of the pivots. The radii of the circular peripheral edges 56 of the skids 20 are sufficiently great so that the wheels 62 clear the floor surface when the mounting levers 70 occupy the positions shown in Fig. 4. Consequently the skids 20 rest upon the floor surface.

Thus, it will be appreciated that each retractable wheel assembly is supported in both its inoperative and operative positions by the adjacent skid 20 whereby the attachment of the skid to the platform also becomes a mounting for the wheel assembly. Moreover, the reaction of the floor or other support surface on each wheel 62 is transmitted to its support skid 20 through the pivotal connection 72 between the wheel lever 70 and the skid, the abutment stop 54 on the skid which limits upward swinging movement of the lever wheel arm, and the lever bracket 78 which slidably engages the skid. These multiple connections between each skid 20 and its attached lever when the latter is in load bearing position produces an inherent sturdiness in the wheel mounting, which can, therefore, be fabricated from relatively light weight structural parts.

As shown in Fig. 3, bushings 80 are positioned between the rear wheel axles 66 and the respective mounting levers 70. The inner ends of the bushings 80 have neck portions 82 of reduced diameter extending into circular openings 84 in the levers 70. Welds 86 secure the outer peripheries of the bushings 80 to the respective levers 70, and second welds 88 bond the inner ends of the respective bushings 80, the inner ends of the axles 66, and the inner surfaces of the circular openings 84. The necks 82 of the respective bushings extend into the openings 84 in the levers only enough to center the bushings in the openings. The second welds 88 and the inner ends of the axles 66 occupy portions of the respective openings 84 but neither the welds nor the axles protrude beyond the inner surfaces of the respective levers 70. Consequently the levers 70 may intimately engage the skids 20 without interference from the welds 88 or the axles 66. The bushings 80 have flat outer bearing surfaces 89 engaging the hubs of the wheels 62.

Assembling the respective axles 66, levers 70, and bushings 80 is particularly easy and economical. For example, one of the bushings 80 may be inserted in the opening 84 and the first weld 86 completed to secure the bushing in position. Then one of the axles 66 may be inserted in the bushing and the second weld 88 completed to secure the axle in position. The second weld also provides additional material securing the bushing to the lever 70.

Fig. 5 illustrates the details of the assembly of the front wheel 36, the clevis 38, and the yoke 46 for the handle 48. The clevis supports the axle 40 which is provided with a sleeve 90 forming a bearing for the wheel 36 and the yoke 46. The sleeve 90 also serves as a spacer for the arms of the clevis 38.

The details of the swivel mounting of the front wheel clevis 38 are shown in Fig. 6. The pivot 42, which supports the clevis 38, is secured to the mounting plate 44 in much the same manner as the rear axles 66 are secured to the mounting levers 70. A necked bushing 92 is positioned between the pivot 42 and the mounting plate 44. The outer periphery of the bushing 92 is secured to the mounting plate 44 by means of a first weld 94, and the inner ends of the bushing 92 and the pivot 42 are bonded to the mounting plate 44 by means of a second weld 96. As previously explained in connection with Fig. 3, this construction is very strong and economical. Moreover, the upper end of the pivot 42 does not protrude beyond the upper surface of the mounting plate 44. Consequently, there is no interference between the swivel mounting and the undersurface of the top plate 28, to which the mounting plate 44 is secured.

As shown in Fig. 1, a pair of removable lugs 100 may be secured to the rear bar 12 for holding a drum or some similar object in position on the dolly.

As shown in Fig. 7, the lower portions of the lugs 100 have central vertical slots 102 for embracing the rear bar 12. Each of the lugs has a thumb screw 104 extending into the slot 102 for clamping the lug to the bar. The lugs 100 extend a short distance above the top of the bar for engaging the lower edge of a drum.

When the dolly is to be loaded with a heavy drum, the retaining lugs 100 are removed and the rear wheels 62 are retracted by moving the mounting levers 70 to the positions illustrated in Fig. 4. The drum may then readily be loaded on the dolly over the rear bar 12 by a combined rolling and sliding motion. As shown, the vertical thickness of the load-carrying platform 10 is quite small. Moreover, the support skids 20 extend only a short distance below the platform, the wheel levers 70 being pivoted to the skids about axes located above the platform to make feasible the extension of the wheel support arms of the levers to a length suitable for unstrenuous lifting of the platform and its load onto the wheel supports. Because of the thinness of the platform and the short extension of the skids below the platform, the top of the platform upon retraction of the support wheels is brought down to an extremely low level. Thus, the drum need be tilted only slightly for loading it upon the dolly. The friction between the skids 20 and the floor surface prevents the dolly from moving freely while the drum is being loaded, and the loading of the drum is thereby greatly facilitated. Moreover, loading the drum is relatively safe because there is no danger that the dolly will roll out from under the drum during the loading operation.

Once the drum is in place on the dolly, the retaining lugs 100 are clamped to the rear bar 12 to prevent the drum from shifting on the dolly. The rear wheels 60 and 62 are then lowered by moving the upper handles 74 of the mounting levers 68 and 70 to the positions illustrated in Figs. 1 and 2. This is an easy task because of the mechanical advantage provided by the relatively long handles 74. There is no danger that the wheels will retract accidentally because the weight of the loaded dolly holds the lower arms of the wheel levers 70 against the stops 54 on the skids 20.

Because of the swivel mounting of the front wheel, the dolly may be maneuvered about the floor surface very readily. When the drum is to be unloaded, the retaining lugs 100 are removed, the rear wheels are retracted, and the drum is removed by a combined sliding and rolling motion.

While I have shown and described a preferred embodiment of my invention, it will be apparent that numerous variations and modifications thereof may be made without departing from the underlying principles of the invention. I, therefore, desire, by the following claims, to include within the scope of the invention all such modifications and variations by which substantially the results of my invention may be obtained through the use of substantially the same or equivalent means.

I claim:

1. In a dolly, the combination of a load-carrying platform, a vertical skid plate having its inner surface fixed to the platform and having a generally circular edge protruding below the platform, a lever having a relatively long upper arm and a relatively short lower arm, the lever being pivoted to the outside of the skid plate approximately at the center of curvature of the circular edge, the lower end of the lever being bent inwardly to form a bracket embracing the circular edge, a stop fixed to the skid plate for engaging the lower lever arm to limit rotation of the lever in one direction at a position somewhat beyond a vertical position, and a wheel rotatably mounted on the lower lever arm, the wheel being large enough to extend downwardly beyond the skid plate when the lever is against the stop, the lever being rotatable away from the stop to raise the wheel above the lowest point on the circular edge of the skid plate.

2. A dolly for carrying a drum, comprising a generally triangular load-carrying platform including a pair of side bars and a rear bar, a front wheel, a swivel mounting connecting the front wheel with the platform, a pair of skids secured to and extending below the platform, a pair of rear wheels, a pair of retractable mountings respectively connecting the rear wheels with the platform at points adjacent the respective skids for retracting the wheels to lower the skids to a floor surface for loading a drum on the platform, an abutment fixed to and protruding above the platform at its front end to engage the periphery of a drum, and a pair of lugs for clamping to the rear bar to retain the drum on the platform.

3. A dolly for transporting heavy drums and the like, comprising, in combination, a load carrying platform having a vertically thin rear portion, a steerable support wheel mounted on the forward portion of said platform, a pair of generally vertical skid plates fixed to said rear portion of said platform to extend a short distance therebelow and a substantial distance thereabove, a pair of shiftable wheel arms having pivotal connections to the upper portions of said respective skid plates, said levers each including a wheel arm having a support wheel journaled thereon; operating means on each lever for swinging said wheel arm thereof and the attached wheel reversibly from a raised, inoperative position to a lowered, operative position in reaching which the axis of said wheel is carried under and positioned slightly to one side of the pivotal axis of the lever; and abutment means on each plate engageable with the wheel arm of the associated lever to positively locate the latter in said operative position and partially sustain the vertical reaction of said wheel on the lever.

4. In a dolly for transporting lubricant drums or the like, the combination of a vertically thin platform, a skid member fixed to said platform to extend above and below the adjacent portion thereof, a shiftable wheel lever pivoted to the upper portion of said skid member about an axis located a considerable distance above said adjacent portion of said platform, said lever including a wheel arm extending from said axis, a support wheel journaled on said wheel arm, a handle on said lever for swinging said wheel arm and said wheel reversibly from an inoperative position above the lower extremity of said skid to carry the axis of said wheel downwardly and horizontally under the pivotal axis of said lever to an operative position slightly to one side of said lever axis in which said wheel extends below the lower portion of said skid, and abutment means on said skid member engageable with said wheel arm to locate the latter in said operative position and transmit to the wheel arm a portion of the weight supported by said wheel.

5. In a dolly for transporting drums and the like, the combination of a platform having a vertically thin loading portion, a generally vertical skid plate fixed to said loading portion to extend a short distance therebelow and a substantial distance thereabove, a shiftable wheel arm having a pivotal connection to the upper portion of said skid plate about an axis disposed a substantial distance above the adjacent portion of said platform, said lever including a wheel arm having a bracket on the end thereof shaped to extend slidably around the lower portion of said skid plate, a support wheel journaled on said wheel arm; an operating member on said lever for swinging said arm and said wheel reversibly from a raised, inoperative position to a lowered, operative position in reaching which the axis of said wheel is carried under and positioned slightly to one side of the pivotal axis of said lever, and abutment means on said plate engageable with said wheel arm to positively locate the latter in said operative position and cooperate with said bracket and said pivotal connection to sustain the reaction on said skid plate of said wheel when the latter is in said operative position.

6. In a dolly of the character described, the combination of a vertically thin load-carrying platform, skid means fixed to said platform, said skid means including a lower arcuate portion extending below said platform to rest directly on a floor surface or the like and an upper portion extending above said platform, a shiftable wheel lever pivoted above said platform to said upper portion of said skid means, said lever including a relatively short wheel arm and a part movably engageable with said arcuate portion of said skid means, a support wheel journaled on said arm; a handle arm on said lever operable to shift said wheel between a retracted, inoperative position and a lowered, load bearing position in which the wheel extends below said skid; and abutment means on said skid means at one end of said arcuate portion for coaction with said short arm of said lever to positively locate said wheel in said load bearing position.

References Cited in the file of this patent

UNITED STATES PATENTS

| | | |
|---|---|---|
| 630,987 | Nylander | Aug. 15, 1899 |
| 637,284 | Richman | Nov. 21, 1899 |
| 641,113 | Ingells | Jan. 9, 1900 |
| 750,146 | Wolf | Jan. 19, 1904 |
| 1,544,975 | Gossett | July 7, 1925 |
| 1,570,787 | Schroeder | Jan. 26, 1926 |
| 1,956,245 | Moorman et al. | Apr. 24, 1934 |
| 2,478,995 | Woodman | Aug. 16, 1949 |
| 2,546,801 | Visone | Mar. 27, 1951 |

FOREIGN PATENTS

| | | |
|---|---|---|
| 12,247 | Norway | Oct. 12, 1903 |